Oct. 31, 1967 H. SCHOTTLE 3,349,700

PRINTING PLATE

Filed Sept. 20, 1965

United States Patent Office 3,349,700

Patented Oct. 31, 1967

3,349,700

PRINTING PLATE

Helmut Schottle, Berlin-Charlottenburg, Germany, assignor to Adrema-Werke G.m.b.H., Berlin, Germany Filed Sept. 20, 1965, Ser. No. 488,663

5 Claims. (Cl. 101—369)

This invention relates to printing plates and more especially to metal address printing plates such as are used to provide both optically legible information and computer read information, and is a continuation-in-part of application Ser. No. 318,376.

Metal printing plates are known that have the name and address of an addressee embossed thereon. The printing surfaces of the characters must be high so that the ink will not smudge between characters to render the information illegible.

Attempts have been made to add printing surfaces to such known printing plates to imprint data that can be read by a "computer" or data processing machine. The attempts at using such printing surfaces to imprint information for the computer met with some failure, as well as with some success. While in some cases the computer would read the information correctly, the remainder of the cases would be in error. Detection of errors of this nature are difficult to detect and, if the results are not perfectly reliable the information, or record derived from the machine has no value. Such objective records are in fact misleading.

It is an object, therefore, of the present invention to provide a printing plate made of sheet metal, or similar material, that will print information, such as a name and address, for visual reading, and concomitant information to be read by mechanical means, for instance magnetism, in a computer or data processing machine.

It is a further object of the present invention to provide such a printing plate to be used in address printing machines presently in use, contemplating only a minor changed structure of the anvil that also serves as a guiding track for the plates.

Other and further objects and advantages will appear from the following specification taken with the accompanying drawing in which said characters refer to similar parts in the several views, and in which.

Figure 1:
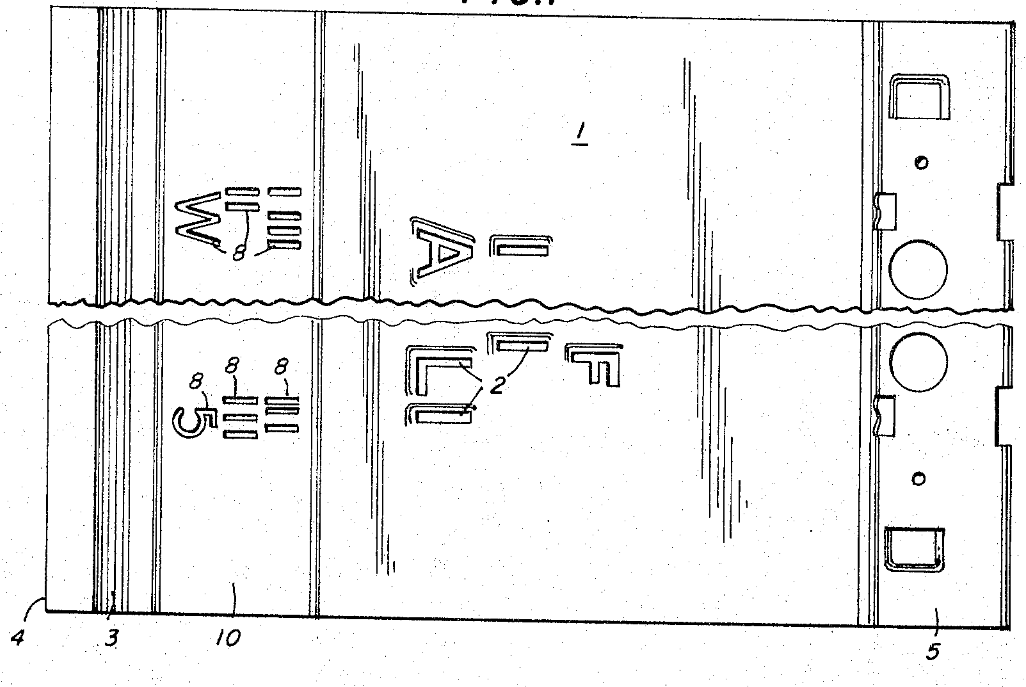
FIGURE 1 is a view from the bottom of the plate so that the type on the plate reads correctly.
Figure 2:
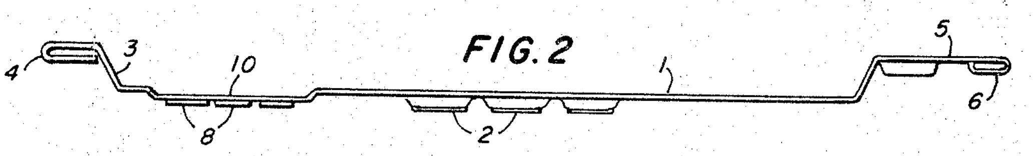
FIGURE 2 is an end view of the plate of FIGURE 1, looking up at FIGURE 1.
Figure 3:
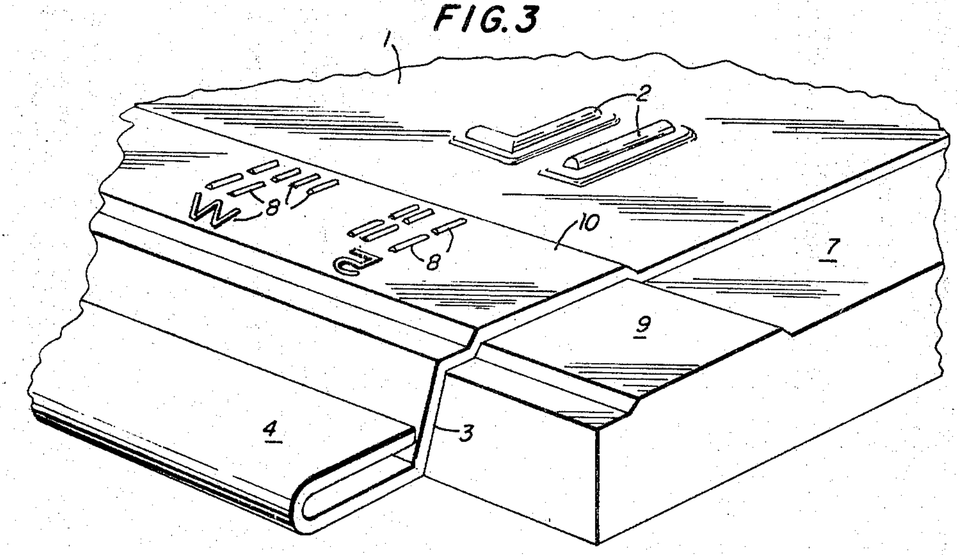
FIGURE 3 is a fragmentary perspective view of the printing plate in printing position on the anvil of an addressing machine.

No parts of the known data processing machine, or computer is shown, as such structure is not novel and is not part of the present invention, it is only necessary to be known that characters such as shown at 8, if accurately printed will actuate the data processing machine but if inaccurately printed will not activate it reliably.

In the drawing a printing plate is shown having a broad planar surface 1 in which ordinary known printing indicia 2 has been embossed so that, when run through an address printing machine a clean legible print is made. The two edges of the plate are flanged and hemmed at 3, 4 and at 5 and 6 all of which is found in the known printing plates. The height of the printing surfaces of indicia 2 above the plate of surface 1, must be 0.6 to 0.7 mm., in order to print legibly.

With the raised indicia 2 being so elevated, the heavy printing pressures actually deform the printing surfaces so that the entire printing surface is not pressed with equal force against the paper being printed. This results in irregular printing which; in print to be read visually is immaterial, but, to be read mechanically, is not desirable because it is not reliable.

It is not obvious that printed indicia clearly readable by eye is not clear to a computing or data processing machine while printed indicia that can be accurately read by the machine will be entirely illegible to the eye. Nor is it apparent how a single printing plate can be provided that will print type readable by eye and also print indicia so accurately readable by the data processing machine that the resultant processed data is dependable.

It was known that very low printing indicia would not distort under the heavy printing pressures, but it was immediately clear from looking at the print from such a printing plate that the result of such printing is illegible, so it was clear that such very low printing indicia could not be used in connection with printing a message to be read by a data processing machine that must for accuracy have perfectly defined print in order to be entirely reliable.

After considerable experimentation the optically or visually undecipherable printing with very low printing indicia was tried and, all of the opinions to the contrary notwithstanding, it was discovered that the low projection of the digital characters of about 0.2 mm. gave a print that the data processing machine could readily and accurately read in spite of it being, to the eye, a mere smudge.

In order, then to provide for reading by a data processing machine, an address plate needs to be equipped with very low digital characters, while at the same time the same address plate needs to provide standard height printing characters so that the address could be read by the postman, for instance.

The address printing machine is provided with a support, or anvil 7 on which the planar portion 1 of the plate is placed for printing. Characters 2 on portion 1 of the plate project about 0.7 mm., so that the space between the characters will not print.

In order to provide support for the projections 8, which are the projections that print the information to be read by the data processing machine, an elevated guide track 9 is provided. The height of the track 9 being sufficient to raise the projections 8 to have their faces lie in a common plane with the faces of projections 2.

A planar surface 10 extending from end to end of the plate is provided on the address plate to carry the projections 8 and is displaced from the planar surface 1 a distance corresponding to the height of track 9. The height of projections 8 above surface 1 is conveniently 0.2 mm. so the height of track 9 above surface 7, and the height of planar surface 10 above planar surface 1 is preferably 0.4 to 0.5 mm. Slight changes of dimension may, of course, be made within the scope of the present invention.

Having thus disclosed by invention, I claim:

1. A printing plate of sheet material particularly for use in addressing machines of the type in which printing plates are fed lengthwise through the machine said printing plate comprising a body, means defining a first planar surface on said body providing a first printing field adapted to receive embossed printing characters to print optically legible information means defining second planar surface on said body raised with respect to said first planar surface and extending longitudinally for the full length of said body from one end to the opposite ends for providing a second printing field adapted to receive embossed printing characters to print information legible to a "computer" and embossed printing characters on each of said printing fields the height of the embossed printing characters on each field being such that the printing surfaces of all said characters lie in a common plane, said second planar surface being adapted to receive therebelow a support means of said machine during printing by the plate.

2. The printing plate as claimed in claim 1 in which the width dimension of said second planar surface corresponds to the total width of lines of characters to be printed by the characters on said second planar surface.

3. The printing plate as claimed in claim 1 in which said second planar surface is raised beyond said first planar surface a distance of approximately 0.4 to 0.5 mm.

4. The printing plate as claimed in claim 2 in which said second planar surface is raised beyond said first planar surface a distance of approximately 0.4 to 0.5 mm.

5. The printing plate as claimed in claim 4 in which the height of the printing characters on said second planar surface is approximately 0.2 mm.

References Cited

UNITED STATES PATENTS

| | | | |
|---|---|---|---|
| 1,026,250 | 5/1912 | Duncan | 101—369 |
| 1,026,254 | 5/1912 | Duncan | 101—369 X |
| 1,259,001 | 3/1918 | Dolcater | 101—369 X |
| 2,032,459 | 3/1936 | Allen | 101—369 |

FOREIGN PATENTS

| | | |
|---|---|---|
| 713,534 | 8/1931 | France. |
| 1,197,474 | 6/1959 | France. |
| 682,982 | 11/1952 | Great Britain. |
| 810,235 | 3/1959 | Great Britain. |

ROBERT E. PULFREY, *Primary Examiner.*

DAVID KLEIN, *Examiner.*

P. R. WOODS, *Assistant Examiner.*